P. McQUAID.
Land-Marker.

No. 56,970.  Patented Aug 7. 1866.

Witnesses:  Inventor,

UNITED STATES PATENT OFFICE.

PRESTON McQUAID, OF WENONA, ILLINOIS.

IMPROVEMENT IN MACHINES FOR MARKING GROUND FOR PLANTING.

Specification forming part of Letters Patent No. 56,970, dated August 7, 1866.

*To all whom it may concern:*

Be it known that I, PRESTON McQUAID, of Wenona, in the county of Marshall and State of Illinois, have invented a new and Improved Device for Marking Ground for Planting Corn; and I do hereby declare that the following is a full, clear, and exact description thereof, which will enable others skilled in the art to make and use the same, reference being had to the accompanying drawings, forming part of this specification, in which—

Figure 1:
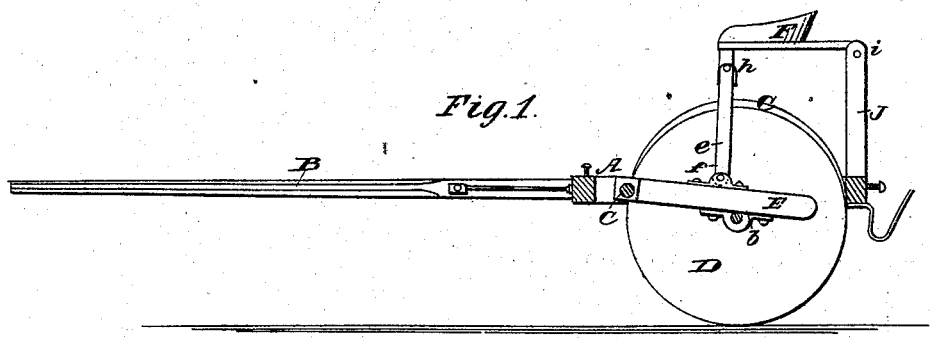
Figure 2:
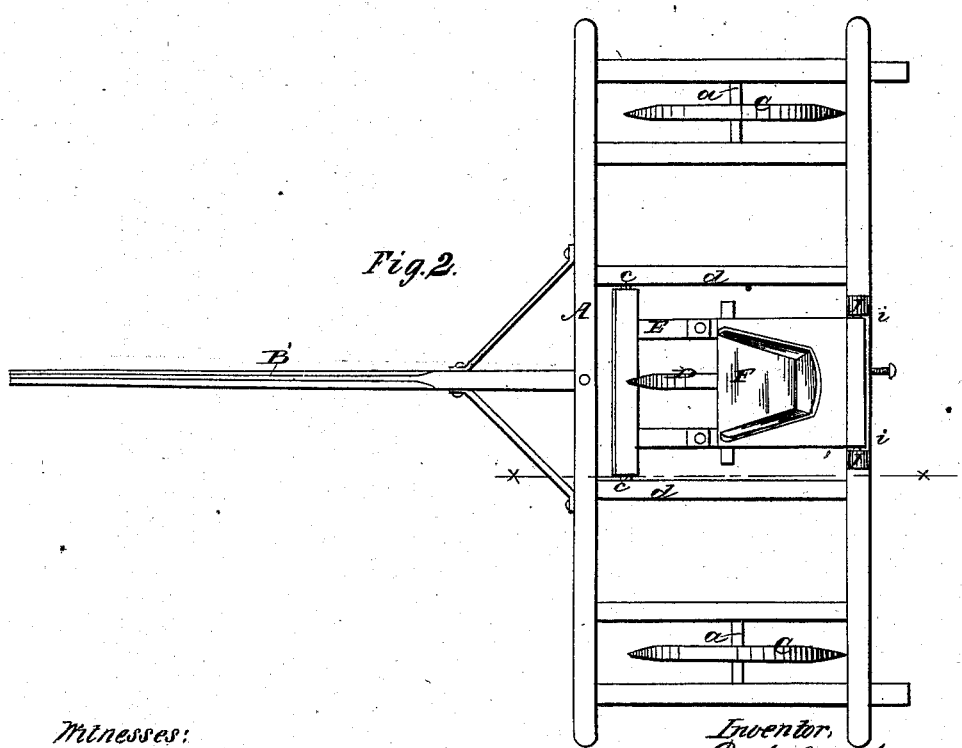

Figure 1 is a side sectional view of my invention taken in the line $x\,x$, Fig. 2; Fig. 2, a plan or top view of the same.

Similar letters of reference indicate like parts.

This invention relates to a new and improved device for the marking of ground for planting corn in check-rows; and it consists of three wheels placed at a suitable distance apart within a proper frame, and the central wheel arranged or applied in such a manner that it may rise and fall to admit of the several wheels accommodating themselves to the inequalities of the ground over which they may pass.

A represents a rectangular frame, which has a draft-pole, B, attached to it, and three wheels, C C D, fitted within it. The wheels C C are near the ends of the frame A, and have their axles $a$ working in fixed bearings, but the central wheel, D, has its axle $b$ fitted in a frame, E, the front end of which, at each side, is provided with journals $c$, which are fitted and work in longitudinal bars $d\,d$ of the frame A.

The frame E has the lower ends of two uprights, $e\,e$, secured to it by pivots $f$, and these uprights are connected by a cross-bar, and the upper ends of the uprights are connected by joints $h$ to the front end of a driver's seat, F, the rear end of said seat having a journal, $i$, at each side, and these journals are fitted in the upper ends of uprights $j\,j$, secured on the rear of the frame A.

By this arrangement it will be seen that the central wheel, D, will be allowed to rise and fall to conform to the inequalities of the ground over which it may pass, the weight of the driver having a tendency to keep the wheel D down, and this movement or adjustment of wheel D also admits of a similar adjustment of the wheels C C. Hence the ground will be marked with three parallel furrows or marks made by the wheels C C D. The wheels C C D may be of wood or metal, and they are beveled at their edges or peripheries, to admit of them penetrating the earth.

The whole arrangement is extremely simple and efficient, and may be constructed at a moderate cost.

Having thus described my invention, I claim as new and desire to secure by Letters Patent—

The frame A, with draft-pole B attached, and having two marking-wheels, C C, fitted within it on axles working in fixed bearings, in combination with the adjustable or rising-and-falling wheel D, fitted within the frame A, and connected with the driver's seat F, substantially in the manner as and for the purpose herein set forth.

PRESTON McQUAID.

Witnesses:
   Z. P. BECKWITH,
   R. C. MULHALLEN.